United States Patent
Maruta et al.

(10) Patent No.: US 9,473,225 B2
(45) Date of Patent: *Oct. 18, 2016

(54) METHOD FOR IMPROVING TRANSMISSION CAPACITY IN A DL MU-MIMO COMMUNICATIONS SYSTEM

(71) Applicant: NEC Corporation, Tokyo (JP)

(72) Inventors: Yasushi Maruta, Tokyo (JP); Duong Pham, Mulgrave (AU); Arun Gurung, Mulgrave (AU)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,962

(22) PCT Filed: Sep. 13, 2013

(86) PCT No.: PCT/JP2013/075604
§ 371 (c)(1),
(2) Date: Mar. 4, 2015

(87) PCT Pub. No.: WO2014/046273
PCT Pub. Date: Mar. 27, 2014

(65) Prior Publication Data
US 2015/0236767 A1    Aug. 20, 2015

(30) Foreign Application Priority Data
Sep. 18, 2012 (AU) ............................... 2012904070

(51) Int. Cl.
*H04B 7/04* (2006.01)
*H04B 15/00* (2006.01)
*H04B 7/06* (2006.01)

(52) U.S. Cl.
CPC .......... *H04B 7/0456* (2013.01); *H04B 7/0452* (2013.01); *H04B 15/00* (2013.01);
(Continued)

(58) Field of Classification Search
CPC   H04B 7/0417; H04B 7/0452; H04B 7/0632; H04B 7/0689; H04B 7/0482; H04B 7/0639
See application file for complete search history.

(56) References Cited

U.S. PATENT DOCUMENTS

| 2008/0165883 A1 | 7/2008 | Jiang et al. |
| 2010/0034146 A1 | 2/2010 | Hou et al. |

(Continued)

FOREIGN PATENT DOCUMENTS

| CA | 2815711 A1 | 5/2012 |
| EP | 2 562 951 A1 | 2/2013 |

(Continued)

OTHER PUBLICATIONS

3GPP TSG RAN WG1 #68 R1-120127, "CQI Enhancement for MU-MIMO in Scenario A and C," Sony Corporation, Feb. 6, 2012, 5 pages.

(Continued)

*Primary Examiner* — Ross Varndell
(74) *Attorney, Agent, or Firm* — Wilmer Cutler Pickering Hale and Dorr LLP

(57) ABSTRACT

A method according to the present invention is for selecting User Equipment (UE) for scheduling/precoding within the coverage area of a communications node having a predefined codebook. The method includes: receiving at the communications node feedback information from each of the UEs within the coverage area of the communications node wherein the feedback information includes at least one precoder matrix indicator (PMI); generating at the communications node a precoder matrix based on the reported precoder matrix indicator from each UE; determining at the communications node correlation values for each UE in the coverage utilizing the precoder matrix; identifying a pair of UEs having minimum correlation values; and selecting the identified UEs for scheduling/precoding if the minimum correlation value is less than or equal to a threshold value.

19 Claims, 5 Drawing Sheets

(52) U.S. Cl.
CPC .......... *H04B 7/0417* (2013.01); *H04B 7/0482* (2013.01); *H04B 7/0632* (2013.01); *H04B 7/0639* (2013.01); *H04B 7/0689* (2013.01)

(56) References Cited

U.S. PATENT DOCUMENTS

| | | |
|---|---|---|
| 2010/0322176 A1 | 12/2010 | Chen et al. |
| 2011/0194593 A1 | 8/2011 | Geirhofer et al. |
| 2012/0093089 A1 | 4/2012 | Park et al. |
| 2013/0089159 A1 | 4/2013 | Liu |
| 2013/0094380 A1 | 4/2013 | Taoka et al. |
| 2013/0201862 A1 | 8/2013 | Cui et al. |
| 2013/0229941 A1 | 9/2013 | Huang et al. |
| 2014/0233498 A1 | 8/2014 | Chen et al. |
| 2015/0236767 A1* | 8/2015 | Maruta ................ H04B 7/0456 375/267 |

FOREIGN PATENT DOCUMENTS

| | | |
|---|---|---|
| WO | WO-2011/132727 A1 | 10/2011 |
| WO | WO-2011/158302 A1 | 12/2011 |
| WO | WO-2012/065278 A1 | 5/2012 |

OTHER PUBLICATIONS

International Search Report, Corresponding to PCT/JP2013/075604, dated Dec. 10, 2013, 1 page.

Partial Supplementary European Search Report issued in corresponding European Application No. 13838760.0, dated Feb. 3, 2016, 8 pages.

Extended European Search Report issued by the European Patent Office for Application No. 13838760.0 dated Jun. 1, 2016 (16 pages).

* cited by examiner

METHOD FOR IMPROVING TRANSMISSION CAPACITY IN A DL MU-MIMO COMMUNICATIONS SYSTEM

CROSS-REFERENCE TO RELATED APPLICATIONS

The present application is a national stage application of International Application No. PCT/JP2013/075604 entitled "Method for Improving Transmission Capacity in a DL MU-MIMO Communications System," filed on Sep. 13, 2013, which claims the benefit of priority from Australian Patent Application 2012904070, filed on Sep. 18, 2012, the disclosures of which are incorporated herein in their entirety by reference thereto.

TECHNICAL FIELD

The present invention relates methods for improving transmission capacity in a communications system. In particular although not exclusively the present invention relates to methods for enhancing transmission capacity in MU-MIMO based Communication Systems.

BACKGROUND ART

MIMO technology has attracted attention in wireless communications as it offers significant increase in data throughput and link range without the need for additional bandwidth or increased transmit power. This increase in throughput is achieved by spreading the same total transmit power over the antennas to achieve an array gain that improves the spectral efficiency (more bits per second per hertz of bandwidth) or to achieve a diversity gain that improves the link reliability (reduced fading). Because of these properties, MIMO is an important part of modern wireless communication standards such as IEEE 802.11n (WiFi), HSPA+, 4G, 3GPP Long Term Evolution (LTE), LTE-Advanced (LTE-A), WiMAX, etc.

Multi-user MIMO or MU-MIMO is an enhanced form of MIMO technology that is gaining acceptance. MU-MIMO enables multiple independent radio terminals to access a system enhancing the communication capabilities of each individual terminal. MU-MIMO exploits the maximum system capacity by scheduling multiple users to be able to simultaneously access the same channel using the spatial degrees of freedom offered by MIMO.

SUMMARY OF INVENTION

Technical Problem

A general MU-MIMO system 100 is shown in FIG. 1. As shown the transmitter 101 transmits data to different receivers 102, 103 on the same time-frequency from multiple transmit antennas. To minimise interference between receivers 102, 103, the transmitter creates transmission beams through pre-coding. At the receiving site, the receivers 102, 103 use post-coding (decoding) to take its data. Pre-coding is very much depended on the channel status. Mathematically, a MU-MIMO system is described as follows:

$$y(i) = H(i)V(i)x(i) + \sum_{k=1, k \neq i}^{N_{UE}} H(i)V(k)x(k) + n(i) \quad (1)$$

where: y(i) is the received signal at the i-th user, x(i) is the data signal for the i-th user, H(i) is the channel matrix of the i-th user, V(i) is the precoder matrix of the i-th user and n(i) is the additive white Gaussian noise at the i-th user.

FIG. 2 shows one possible transmission mechanism 200 utilised by the transmitter of FIG. 1 to transmit data 201 to different receivers. To minimise inter-user interference, the receivers feedback their channel status information CSI 202 (which includes Precoder Matrix Indicator PMI) to the transmitter. In a system having 2-stage codebook of PMI, the i-th receiver reports 2 PMIs: PMI#1 and PMI#2 denoted by $W(i)_1$ and $W(i)_2$. PMI#1 represents the long term or wideband channel and PMI#2 the short term or instant channel.

The transmitter then uses the reported PMIs to generate the precoder for the i-th receiver as:

$$V(i) = W(i)_1 \times W(i)_2 \quad (2)$$

While this form of pre-coding is effective it is not optimal. Additionally the use of such direct pre-coding can fail in some cases, particular where the receivers are too close to each other.

Clearly it would be to provide a method for pre-coding which mitigates the likelihood of failures. It would also be advantageous to provide a method for pre-coding which improves transmission capacity between transmitters and receivers.

Solution to Problem

Accordingly in one aspect of the present invention there is provided a method for selecting User Equipment (UE) for scheduling/precoding within the coverage area of a communications node having a predefined codebook said method including the steps of:

receiving at the communications node feedback information from each of the UEs within the coverage area of the communications node wherein the feedback information includes at least one precoder matrix indicator (PMI);

generating at the communications node a precoder matrix based on the reported precoder matrix indicator from each UE;

determining at the communications node correlation values for each UE in the coverage utilising the precoder matrix;

identifying a pair of UEs having minimum correlation values; and selecting the identified UEs for scheduling/precoding if the minimum correlation value is less than or equal to a threshold value.

Suitably the predefined codebook is a 2-stage codebook and the feedback information includes a first precoder matrix indicator $PMI_1$ and second precoder matrix indicator $PMI_2$. In such cases the procoder matrix W(i) for reported $PMI_1$ and $PMI_2$ from each UE may be generated by $W(i)=W(i)_1 \times W(i)_2$ where $i=1, \ldots, \Phi$.

Preferably the correlation values are given by $C_{corr}(i,j)=tr\{[W^H(i)W(j)]^H[W^H(i)W(j)]\}$, where $i=1, \ldots, \Phi-1$, $j=i+1, \ldots, \Phi$. The minimum correlation values may be determined by $C_{corr}(\tilde{i},\tilde{j})=\min\{C_{corr}(i,j)\}$, for $(\tilde{i},\tilde{j})=\arg\min\{C_{corr}(i,j)\}$.

In yet another aspect of the present invention there is provided a method of precoding data transmissions in a communications node servicing User Equipment within the node's coverage area the communications node having a predefined codebook servicing said method including the steps of:

selecting a User Equipment (UE) from within the coverage area as candidates for precoding wherein the selection of the UEs is based on correlation values calculated for each UE within the coverage area utilising a precoder matrix generated from precoder matrix indicators reported to the communications node by each UE;

determining correlation values for the selected UEs based on the reported precoder matrix indicator and Channel Matrix obtained from a fixed codebook of representative channel matrices;

selecting a Channel Matrix pair having the highest correlation values; and generating precoders utilising the selected Channel Matrix pair.

Suitably the predefined codebook is a 2-stage codebook and the feedback information includes a first precoder matrix indicator $PMI_1$ and second precoder matrix indicator $PMI_2$. In such cases the procoder matrix $W(i)$ for reported $PMI_1$ and $PMI_2$ from each UE may be generated by $W(i)=W(i)_1 \times W(i)_2$ where $i=1, \ldots, \Phi$.

Preferably the correlation values are given by $C_{corr}(i,j)=tr\{[W^H(i)W(j)]^H[W^H(i)W(j)]\}$, where $i=1, \ldots, \Phi-1, j=i+1, \ldots, \Phi$. The minimum correlation values may be determined by $C_{corr}(\tilde{i},\tilde{j})=\min\{C_{corr}(i,j)\}$, for $(\tilde{i},\tilde{j})=\arg\min\{C_{corr}(i,j)\}$.

The fixed codebook of representative channel matrices may be generated from the long term PMI codebook and short term rank PMI codebook. Suitably the fixed codebook for Rank1, $\Omega_{RANK1}$ of representative channel matrices is generated from the long term PMI codebook and short term rank#1 PMI codebook. Preferably $\Omega_{RANK1}$ contains vectors of size $N_{TX} \times 1$. Suitably Rank 2 the fixed codebook $\Omega_{RANK2}$ of representative channel matrices (CM) is generated from the long term PMI codebook and short term rank#2 PMI codebook. $\Omega_{RANK2}$ contains matrices of size $N_{TX} \times N_{RX}$.

The fixed code books $\Omega_{RANK1}$ and $\Omega_{RANK2}$ may be utilised to identify the representative channels matrices. For Rank 2 the representative channel matrices may be given by $$H(\tilde{n}(\tilde{i})) \in \Omega_{RANK2}, \quad (6)$$

$$H(\tilde{n}(\tilde{j})) \in \Omega_{RANK2}$$

with $$\tilde{n}(\tilde{i}) = \arg\max_n tr\{[H(n)W(\tilde{i})]^H [H(n)W(\tilde{i})]\},$$

$$\tilde{n}(\tilde{j}) = \arg\max_n tr\{[H(n)W(\tilde{j})]^H [H(n)W(\tilde{j})]\},$$

$$H(n) \in \Omega_{RANK2}.$$

For Rank1 a search may be conducted over $\Omega_{RANK1}$ for each of the i-th UE, from the PMI based matrix $W(i)$ for $N_{RX}$ vectors of size $N_{TX} \times 1$. These vectors may then utilised to form the channel matrix $H(i)$ of size $N_{RX} \times N_{TX}$.

Suitably the correlation values for the selected UEs are calculated by $C(i,n)=tr\{[h(n)^H W(i)]^H [h(n)^H W(i)]\}$, $n=1, \ldots, N_{vec}$.

Preferably the step of selecting a Channel Matrix having the highest correlation includes sorting the correlation values $C(i,n_1) > C(i,n_2) > \ldots > C(i,n_{N_{vec}})$ to identify the $N_{RX}$ largest values corresponding to $h(n_1), h(n_2), \ldots, h(n_{N_{RX}})$ to form the channel matrix $H(i)=[h(n_1), h(n_2), \ldots, h(n_{N_{RX}})]^H$.

The step of generating the precoders in one embodiment of the invention may include the steps of a) initializing for all UEs the UE's post coder by setting $G(i)_{(m=0)}=J(i)$, $i=1, \ldots, N_{UE}$ where $J(i)$ is $RI(i) \times N_{RX}$;

b) calculating the precoder $V(i)_{(m+1)}$ for all UEs using $G(i)_{(m)}$;

c) calculating post coder $G(i)_{(m+1)}$ for all UEs using $V(i)_{(m+1)}$;

d) calculating $$E = \sum_{i=1}^{N_{UE}} \|G(i)_{(m+1)} - G(i)_{(m)}\|_F^2$$

and comparing E to a convergence threshold $\epsilon$;

e) setting m=m+1 if $E \geq \epsilon$ and repeat steps b) to d) until $$\sum_{i=1}^{N_{UE}} \|G(i)_{(m+1)} - G(i)_{(m)}\|_F^2 < \epsilon;$$

and f) outputting the precoder $V(i)_{(m+1)}$.

Suitably $V(i)_{(m+1)}$ is calculated in accordance with $$V(i) = \left[\sum_{j=1}^{N_{UE}} H^H(j)G^H(j)G(j)H(j) + \upsilon I\right]^{-1} H^H(i)G^H(i)$$

where $\upsilon$ is the Lagrange multiplier and $G(i)_{(m+1)}$ is calculated in accordance with $$G(i) = V^H(i)H^H(i)\left[\sum_{j=1}^{N_{UE}} H(i)V(j)V^H(j)H^H(i) + N_o(i)I\right]^{-1}$$

where $N_0$ is the noise variance.

In some embodiments of the invention the Lagrange multiplier $\upsilon$ may be calculated according to the following steps:

a) calculating singular values $\lambda_i$ of the decomposition $$U\Lambda U^H = \sum_{i=1}^{N_{UE}} H^H(i)_{m+1} G^H(i)_{m+1} G(i)_{(m+1)} H(i)_{(m+1)};$$

b) setting minimum ($\upsilon_{min}$) and maximum ($\upsilon_{max}$) values of the Lagrange multiplier $\upsilon$ based on the calculated singular values $\lambda_i$;

c) setting the Lagrange multiplier as $\upsilon=(\upsilon_{max}+\upsilon_{min})/2$;

d) calculating $$\hat{P} = \sum_{i=1}^{N_{TX}} \frac{\lambda_i}{(\lambda_i + \upsilon)^2};$$

c) calculating $|\hat{P}-P|$ where P is the total transmit power;

d) comparing $|\hat{P}-P|$ with the convergence threshold g;

e) setting $\upsilon_{max}=\upsilon$ if $|\hat{P}-P|$ is greater than $\epsilon$ and if $\hat{P}$ is less than P;

f) setting $\upsilon_{min}=\upsilon$ if $|\hat{P}-P|$ is greater than $\epsilon$ and if $\hat{P}$ is greater than P;

g) repeating steps c) to f) until $|\hat{P}-P|<\epsilon$ and outputting the Lagrange multiplier $\upsilon$.

In some embodiments of the invention the noise variance $N_0(i)$ may be calculated by calculating the Signal to Interference plus Noise Ratio SINR (i,l) for all UEs based on the SINR threshold contained in the Channel Quality Indicator (CQI) table and then calculating the noise variance $N_0(i)$ for all UEs in accordance with the following:

$$N_o(i) = \frac{P/N_{UE}}{\sum_{l=1}^{RI} SINR(i,l)/RI(i)},$$

$$i=1, \ldots, N_{UE}$$

In some embodiments of the invention $G(i)_{(m+1)}$ may be calculated in accordance with $G(i)=V^H(i)H^H(i)[H(i)V(i)V^H(i)H^H(i)+N_o(i)I]^{-1}$ and the noise variance may be fixed to $N_o(i)=0$, $i=1, \ldots, N_{UE}$.

The reference to any prior art in this specification is not, and should not be taken as an acknowledgement or any form of suggestion that the prior art forms part of the common general knowledge.

Advantageous Effects of Invention

According to each exemplary aspect of the present invention stated above, it is possible to provide a method for pre-coding which mitigates the likelihood of failures. It is also possible to provide a method for pre-coding which improves transmission capacity between transmitters and receivers.

BRIEF DESCRIPTION OF DRAWINGS

In order that this invention may be more readily understood and put into practical effect, reference will now be made to the accompanying drawings, which illustrate preferred embodiments of the invention, and wherein.

DESCRIPTION OF EMBODIMENTS

As will be appreciated by those of skill in the art in a MU-MIMO transmission scheme precoding is often applied based on the channel feedback received from UEs, including a channel rank indicator (RI), channel quality indicator (CQI), and precoding matrix indicator (PMI). The RI indicates the estimated number of simultaneous layers which can be received by the UE. One or more layers can be mapped to the same codeword and are jointly encoded for transmission to the target UE. In 3GPP LTE/LTE Advanced, different codebooks have been defined depending on the number of transmit antenna ports, and they provide precoding support for simultaneous transmission of variable number of layers (data stream) to the same target UE. For simplicity and ease of discussion the following description focuses on the case of two UEs and 2-stage codebook of PMI.

Figure 1:
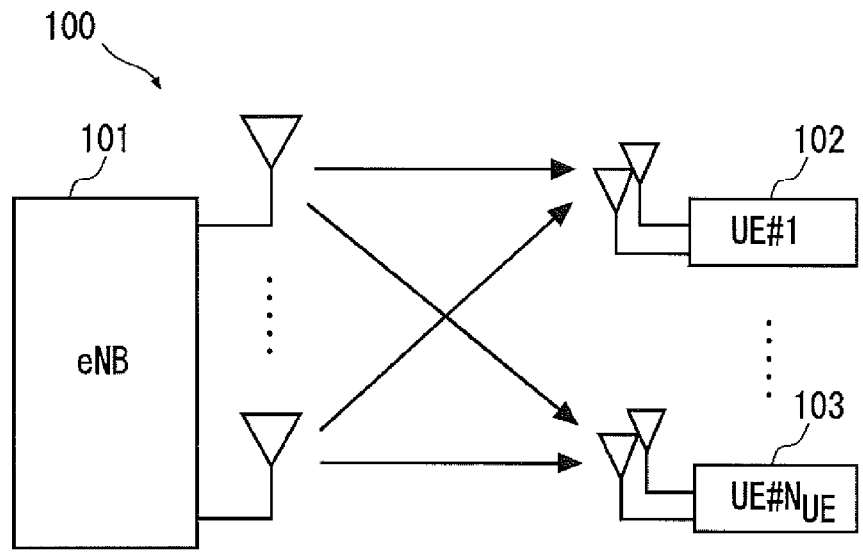
FIG. 1 is a schematic diagram general MU-MIMO system where the eNodeB transmits data to different UEs on the same time-frequency from multiple transmit antennas.
Figure 2:
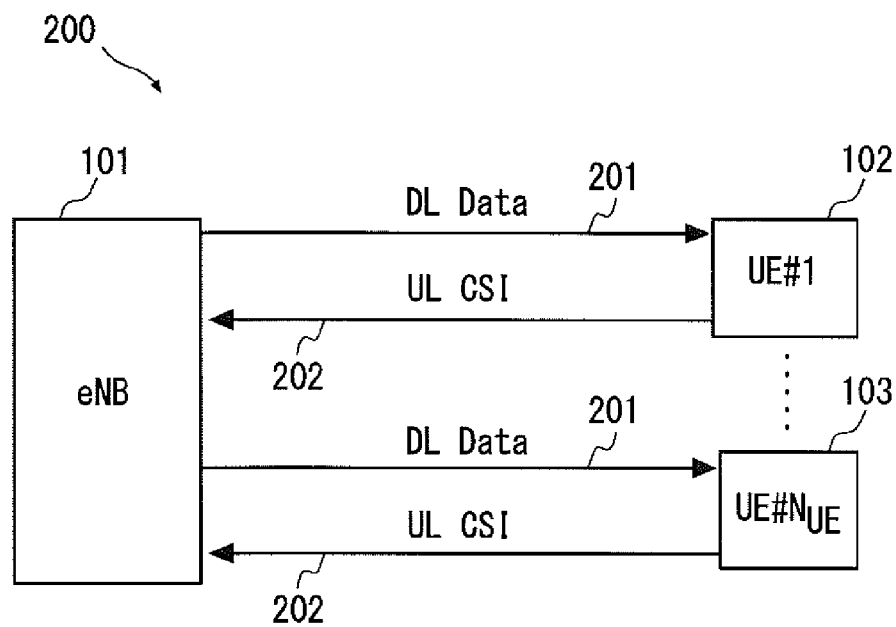
FIG. 2 is a schematic diagram depicting one possible transmission mechanism with UE feedback utilised by the transmitter of FIG. 1 to transmit data to different receivers.
Figure 3:
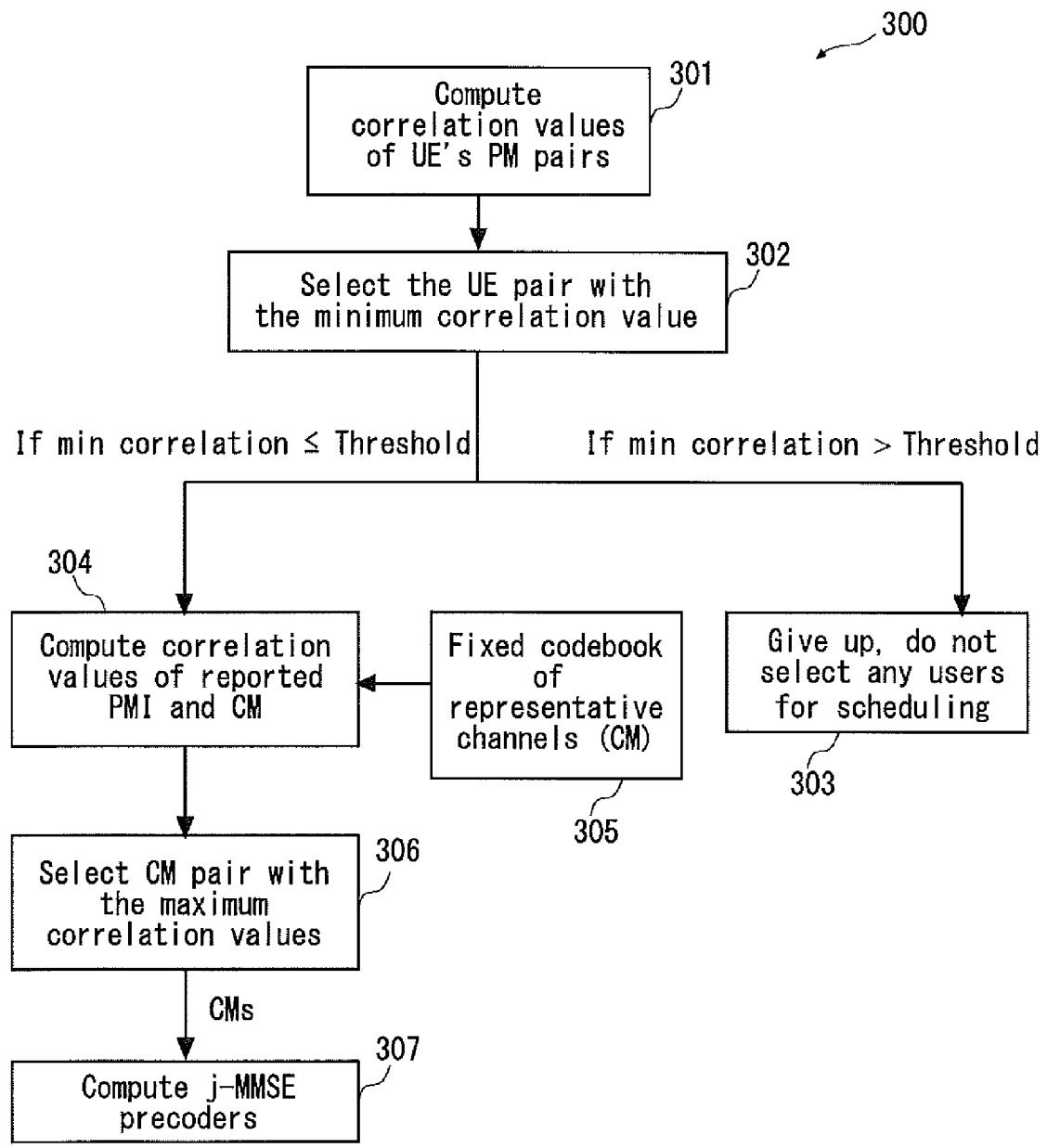
FIG. 3 is a flow chart depicting the process of User Equipment (UE) selection and precoding according to one embodiment of the present invention.

With reference to FIG. 3 there is illustrated a process for User Equipment selection and precoding 300 according to one embodiment of the present invention. As shown the correlation values for of the UEs Precoder Matrix pairs are firstly calculated 301. The Precoder Matrix (PM) being taken from the LTE codebook indexed at the UE's reported PMI. The UE pair with the minimum correlation value is then selected for further processing 302.

In the present example the selection of the UE pair with minimum correlation value is performed as follows. Let $W(i)$ denote the precoder matrix corresponding to the reported PMI#1 and PMI#2 of the i-th UE ($i=1, \ldots, \Phi$). Then $$W(i)=W(i)_1 \times W(i)_2 \tag{3}$$

The correlation values can be calculated per equation (4) below $$C_{corr}(i,j)=tr\{[W^H(i)W(j)]^H[W^H(i)W(j)]\},$$
$$i=1,\ldots,\Phi-1, j=i+1,\ldots,\Phi \tag{4}$$

The minimum correlation values are then provided by the following $$C_{corr}(\tilde{i},\tilde{j})=\min\{C_{corr}(i,j)\},$$

$$(\tilde{i},\tilde{j})=\arg\min\{C_{corr}(i,j)\}. \tag{5}$$

The minimum correlation values are then compared against a correlation threshold T. If the minimum correlation value is greater than the threshold T i.e. $C_{corr}(\tilde{i},\tilde{j})>T$ then the $(\tilde{i},\tilde{j})$ pair are not selected as pair for scheduling/precoding and the process is terminated 303. If the minimum correlation value is less than the correlation threshold T i.e., $C_{corr}(\tilde{i},\tilde{j})\leq T$ the correlation values of the reported PMI and CM are then calculated 304.

The representative channel matrices (CM) in this instance are obtained utilising the fixed codebook of representative channels 305. The fixed codebook of representative channels differs for the rank. For Rank 1 the fixed codebook $\Omega_{RANK1}$ of representative channel matrices is generated from the long term PMI codebook and short term rank#1 PMI codebook. $\Omega_{RANK1}$ contains vectors of size $N_{TX} \times 1$. For Rank 2 the fixed codebook $\Omega_{RANK2}$ of representative channel matrices (CM) is generated from the long term PMI codebook and short term rank#2 PMI codebook. $\Omega_{RANK2}$ contains matrices of size $N_{TX} \times N_{RX}$.

The fixed code books $\Omega_{RANK1}$ and $\Omega_{RANK2}$ are utilised to identify the representative channels matrices. For Rank 2 the representative channel matrices is given by $$H(\tilde{n}(\tilde{i})) \in \Omega_{RANK2}, \tag{6}$$

$$H(\tilde{n}(\tilde{j})) \in \Omega_{RANK2}$$

-continued with $$\tilde{n}(\tilde{i}) = \underset{n}{\operatorname{argmax}} tr\{[H(n)W(\tilde{i})]^H [H(n)W(\tilde{i})]\},$$

$$\tilde{n}(\tilde{j}) = \underset{n}{\operatorname{argmax}} tr\{[H(n)W(\tilde{j})]^H [H(n)W(\tilde{j})]\},$$

$$H(n) \in \Omega_{RANK2}.$$

For Rank1 a search is conducted over $\Omega_{RANK1}$ for each of the i-th UE, from the PMI based matrix W(i) for $N_{RX}$ vectors of size $N_{TX} \times 1$. These vectors are then utilised to form the channel matrix H(i) of size $N_{RX} \times N_{TX}$.

Once the representative channel matrices are identified the correlation values are then calculated in accordance with the following $$C(i,n) = tr\{[h(n)^H W(i)]^H [h(n)^H W(i)]\}, n=1, \ldots, N_{vec} \quad (7)$$

The correlation values are then sorted to find the $N_{RX}$ largest correlation values $C(i,n_1) > C(i,n_2) > \ldots > C(i,n_{N_{RX}})$ corresponding to $h(n_1), h(n_2), \ldots, h(n_{N_{RX}})$ to form a channel matrix $$H(i) = [h(n_1), h(n_2), \ldots, h(n_{N_{RX}})]^H \quad (8)$$

The Channel Matrix pairs having the maximum correlation values are then selected 306 and the precoders then calculated 307 utilising values for $N_o(\tilde{i})$ $N_o(\tilde{j})$ are then calculated using CQI($\tilde{i}$,l), CQI($\tilde{j}$,l) (discussed in greater detail below). Then utilising the values for $N_o(\tilde{i})$, $N_o(\tilde{j})$ and H($\tilde{n}(\tilde{i})$), H($\tilde{n}(\tilde{j})$) with Lagrange multiplier (discussed in greater detail below) values for the precoders V($\tilde{i}$), V($\tilde{j}$) computed.

In this instance the resultant precoders are Minimum Mean Squared Error (MMSE) pecoders which are computed based on the PMI feedback. Consequently information on the channels is not required to produce the precoders. A more detailed discussion of the generation of the MMSE precoders in accordance with an embodiment of the present invention is discussed with respect to FIG. 4 below.

Figure 4:
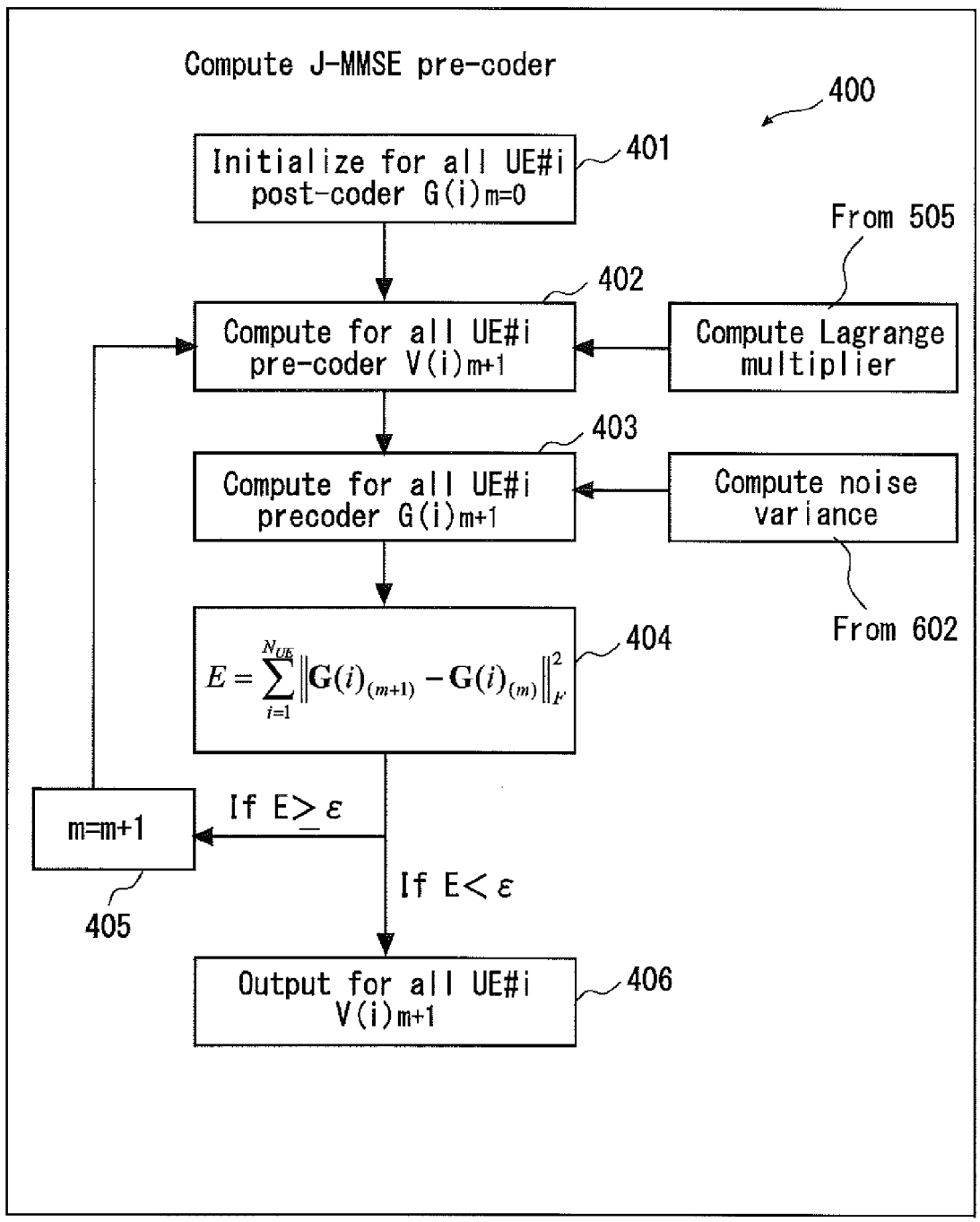
FIG. 4 is a flow chart depicting the process of producing precoders according to one embodiment of the present invention.

With reference to FIG. 4 there is illustrated one process for generating the MMSE precoders according to one embodiment of the present invention. The precoder is generated by firstly initializing the post coder for all UEs 401 as follows:

$$G(i)_{(m=0)} = J(i), i=1, \ldots, N_{UE}.$$

Here J(i) is the matrix $RI(i) \times N_{RX}$ the (a,b)-th element being zero for $a \ne b$ and being 1 for a=b and (m) denotes the m-th iteration. The precoder $V(i)_{(m+1)}$ is then computed for all UEs 402 using $G(i)_{(m)}$ for i=1, ..., $N_{UE}$ and the following equation:

$$V(i) = \left[\sum_{j=1}^{N_{UE}} H^H(j)G^H(j)G(j)H(j) + \upsilon I\right]^{-1} H^H(i)G^H(i) \quad (9)$$

Figure 5:
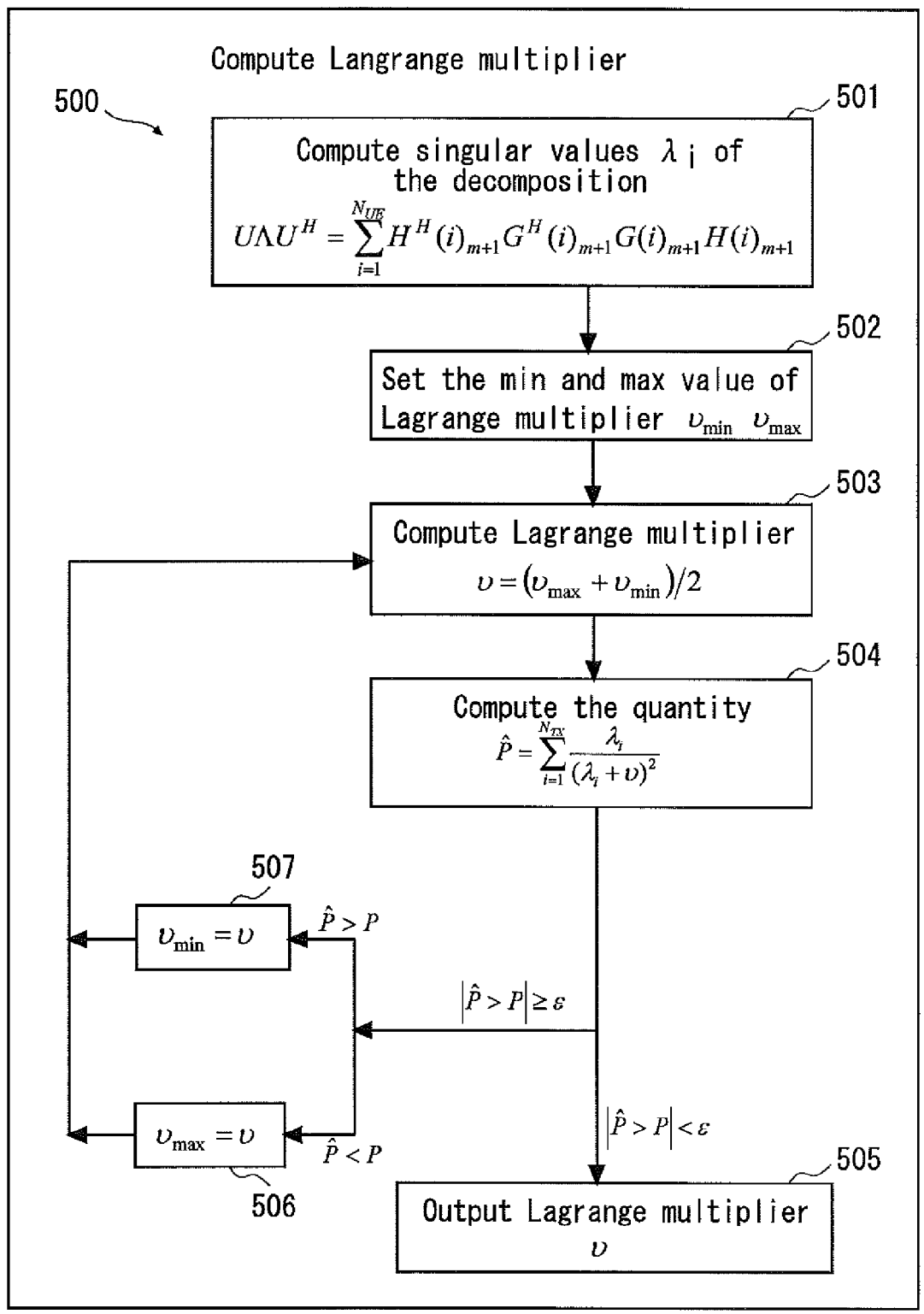
FIG. 5 is a flow chart depicting the process computing Lagrange multiplier for use in the production of the precoders as depicted in FIG. 4 according to one embodiment of the present invention.

In equation 9 the variable υ is the Lagrange multiplier obtained form step 505 in FIG. 5 which is discussed in greater detail below.

The process then proceeds to compute for all UEs the post coder $G(i)_{(m+1)}$ 403 using $V(i)_{(m+1)}$ for i=1, ..., $N_{UE}$ in accordance with the following equation.

$$G(i) = V^H(i)H^H(i)\left[\sum_{j=1}^{N_{UE}} H(i)V(j)V^H(j)H^H(i) + N_o(i)I\right]^{-1} \quad (10)$$

For less complexity, the post coder $G(i)_{(m+1)}$ for each UE can be calculated using the following:

$$G(i) = V^H(i)H^H(i)[H(i)V(i)V^H(i)H^H(i) + N_o(i)I]^{-1} \quad (11)$$

Figure 6:
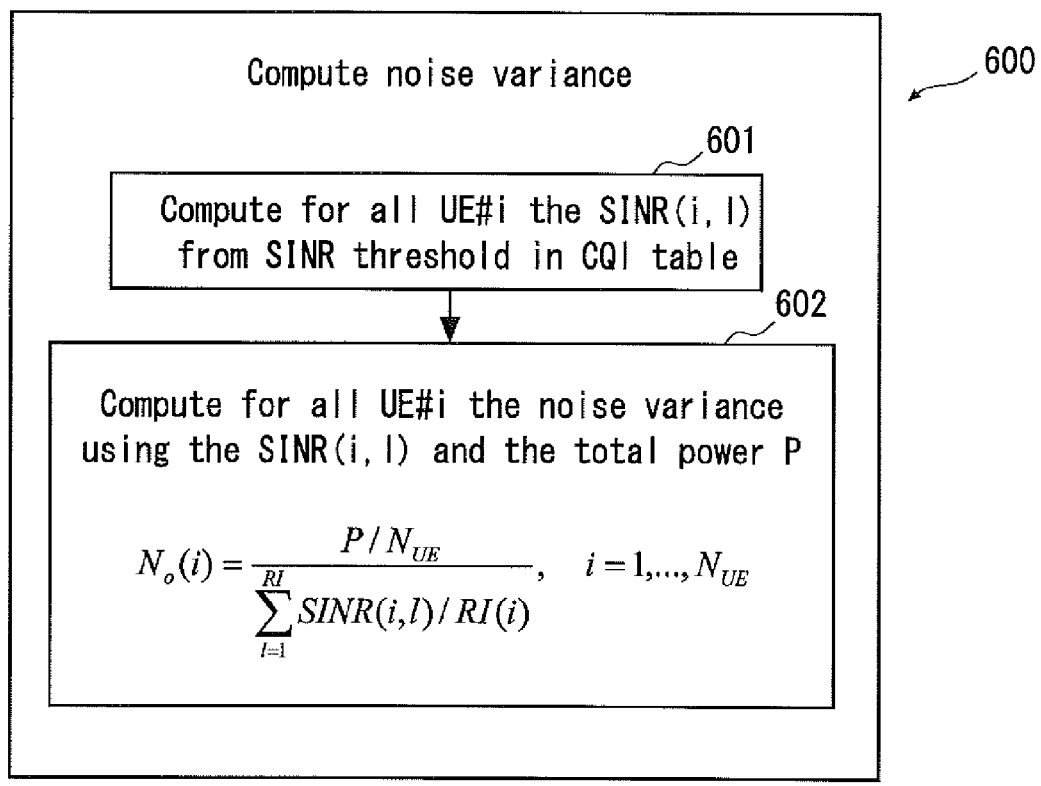
FIG. 6 is a flow chart depicting the process computing noise variance for use in the production of the precoders as depicted in FIG. 4 according to one embodiment of the present invention.

In the case of equations 10 and 11 $N_0(i)$ is the noise variance obtained form step 602 in FIG. 6. The computation of the noise variance is discussed in greater detail below.

The process then computes $$E = \sum_{i=1}^{N_{UE}} \|G(i)_{(m+1)} - G(i)_{(m)}\|_F^2 \quad 404, \text{ here } \|.\|_F^2$$

denotes Frobenius norm. The process then determines if E is greater than or equal to the convergent threshold ϵ i.e. E≥ϵ. If E≥ϵ then the process increments m 405 and repeats the calculations for $V(i)_{(m+1)}$ and $G(i)_{(m+1)}$ per steps 402, 403 to again calculate the value of E. This process is then repeated until $$\sum_{i=1}^{N_{UE}} \|G(i)_{(m+1)} - G(i)_{(m)}\|_F^2 < \varepsilon$$

at which stage the precoder $V(i)_{(m+1)}$ is outputted 406.

As can be seen form the above discussion the calculation of the precoder $V(i)_{(m+1)}$ requires the use of a Lagrange multiplier v. The process of computing the Lagrange multiplier υ 500 is shown in FIG. 5. As shown singular values $\lambda_i$ of the decomposition $$U \Lambda U^H = \sum_{i=1}^{N_{UE}} H^H(i)_{m+1} G^H(i)_{m+1} G(i)_{(m+1)} H(i)_{(m+1)}$$

are computed 501. The minimum and maximum value of the Lagrange multiplier $\upsilon_{max}, \upsilon_{min}$ are then set 502. The Lagrange multiplier is then set 503 as $\upsilon = (\upsilon_{max} + \upsilon_{min})/2$.

Once the Lagrange multiplier has been set the quantity $$\hat{P} = \sum_{i=1}^{N_{TX}} \frac{\lambda_i}{(\lambda_i + \upsilon)^2}$$

is then calculated 504. The process then proceeds to calculate the absolute value $\hat{P}$ less the total transmit power P which is then compared with the convergence threshold ϵ. If the absolute value of is less than ϵ i.e. |$\hat{P}$−P|≥ϵ the value of $\hat{P}$ is compared with the value of P, if $\hat{P}$ is less than P then $\upsilon_{max} = \upsilon$ 506 before resetting the Lagrange multiplier per step 503. If $\hat{P}$ is greater than P then $\upsilon_{min} = \upsilon$ 507 before resetting the Lagrange multiplier per step 503.

The steps of setting the Lagrange multiplier 503, calculation of $\hat{P}$ 504 and setting $\upsilon_{max} = \upsilon$ 506 or $\upsilon_{min} = \upsilon$ are repeated until |$\hat{P}$−P|<ϵ at which stage the Lagrange multiplier υ 505 for use in the calculation of the precoder $V(i)_{(m+1)}$ at step 402 of FIG. 4.

In addition to the use of the Lagrange multiplier the process of generating the pre-coder information on the noise variance $N_0(i)$ is also required. FIG. 6 show one possible procedure for the calculation of the noise variance $N_0(i)$ 600 according to one embodiment of the present invention. As shown the Signal to Interference plus Noise Ratio for all UEs SINR (i,l) is calculated 601 based on the SINR threshold contained in the Channel Quality Indicator (CQI) table. The SINR (i,l) is then utilised in conjunction the total power P to calculate the noise variance $N_0(i)$ for all TIES in accordance with the following:

$$N_o(i) = \frac{P/N_{UE}}{\sum_{l=1}^{RI} SINR(i,l)/RI(i)},$$

$$i = 1, \ldots, N_{UE}$$

For less complexity, the noise variance can be fixed to zero i.e. $N_o(i)=0$, $i=1, \ldots, N_{UE}$ in either case the value for $N_0(i)$ is then utilised in the calculation of $G(i)_{(m+1)}$ at step 403 of the precoder calculation process discussed in relation to FIG. 4 above.

As can be seen form the above discussion the present invention provides MMSE precoders based on the joint transmit & receive optimization method in which utilises the PMI feedback. While the above examples have for the purposes of simplicity and ease of discussion focused on the case of two UEs and 2-stage codebook of PMI it will be appreciated by those of skill in the art that the proposed processes for the generation of precoders is not limited to the case of two UEs and 2-stage codebook of PMI and could be easily expanded to cover cases including multiple UEs and higher stage code books.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

This application is based upon and claims the benefit of priority from Australian Patent Application No. 2012904070, filed on Sep. 18, 2012, the disclosure of which is incorporated herein in its entirety by reference.

REFERENCE SIGNS LIST

100 MU-MIMO system
101 transmitter
102, 103 receiver
200 transmission mechanism
201 transmit data
202 channel status information

The invention claimed is:

1. A method for selecting User Equipment (UE) for scheduling/precoding within the coverage area of a communications node having a predefined codebook said method comprising:
  receiving at the communications node feedback information from each of the UEs within a coverage area of the communications node wherein the feedback information includes at least one precoder matrix indicator (PMI);
  generating at the communications node a precoder matrix based on the reported PMI from each UE;
  determining at the communications node correlation values for each UE in the coverage utilising the precoder matrix;
  identifying a pair of UEs having minimum correlation values; and
  selecting the identified UEs for scheduling/precoding if the minimum correlation value is less than or equal to a threshold value.

2. The method of claim 1 wherein the predefined codebook is a 2-stage codebook and the feedback information includes a first precoder matrix indicator ($PMI_1$) and second precoder matrix indicator ($PMI_2$).

3. The method of claim 2 wherein the procoder matrix $W(i)$ for reported $PMI_1$ and $PMI_2$ from each UE is generated by $W(i)=W(i)_1 \times W(i)_2$ where $i=1, \ldots, \Phi$ and $\Phi$ is the number of UEs.

4. The method of claim 3 wherein the correlation values are given by $C_{corr}(i,j)=tr\{[W^H(i)W(j)]^H[W^H(i)W(j)]\}$, where $i=1, \ldots, \Phi-1$, $j=i+1, \ldots, \Phi$.

5. The method of claim 4 wherein the minimum correlation values are given by $C_{corr}(\tilde{i},\tilde{j})=\min\{C_{corr}(i,j)\}$, for $(\tilde{i},\tilde{j})=\arg\min\{C_{corr}(i,j)\}$.

6. A method of precoding data transmissions in a communications node, one or more User Equipment (UE) being located within the communication node's coverage area, the communications node having a predefined codebook servicing said method comprising:
  selecting the one or more UE from within the coverage area as candidates for precoding wherein the selection of the UEs is based on correlation values calculated for each UE within the coverage area utilising a precoder matrix generated from precoder matrix indicators reported to the communications node by each UE;
  determining correlation values for the selected UEs based on the reported precoder matrix indicator and a channel matrix obtained from a fixed codebook of representative channel matrices;
  selecting a channel matrix pair having the highest correlation values; and
  generating precoders utilising the selected channel matrix pair.

7. The method of claim 6 wherein the predefined codebook is a 2-stage codebook and the precoder matrix indicator includes a first precoder matrix indicator ($PMI_1$) and second precoder matrix indicator ($PMI_2$).

8. The method of claim 7 wherein the procoder matrix $W(i)$ for reported $PMI_1$ and $PMI_2$ from each UE is generated by $W(i)=W(i)_1 \times W(i)_2$ where $i=1, \ldots, \Phi$ and $\Phi$ is the number of UEs.

9. The method of claim 8 wherein the correlation values are given by $C_{corr}(i,j)=tr\{[W^H(i)W(j)]^H[W^H(i)W(j)]\}$, for $i=1, \ldots, \Phi-1$, $j=i+1, \ldots, \Phi$.

10. The method of claim 9 wherein:
  the step of selecting one or more UE is a step of selecting one or more pairs of UEs having minimum correlation values, and
  the minimum correlation values are given by $C_{corr}(\tilde{i},\tilde{j})=\min\{C_{corr}(i,j)\}$, where $(\tilde{i},\tilde{j})=\arg\min\{C_{corr}(i,j)\}$.

11. The method of claim 6 wherein the fixed codebook of representative channel matrices is generated from a long term PMI codebook and a short term rank PMI codebook.

12. The method of claim 11 wherein the correlation values for the selected UEs are calculated by $C(i,n)=tr\{[h(n)^H W(i)]^H[h(n)^H W(i)]\}$ $n=1, \ldots, N_{vec}$, wherein $h(n)$ are channel vectors, $W(i)$ is the precoder matrix, and $N_{vec}$ is the total number of channel vectors.

13. The method of claim 12 wherein the step of selecting a channel matrix pair having the highest correlation includes sorting the correlation values $C(i,n_1) > C(i,n_2) > \ldots > C(i,n_{N_{vec}})$ to identify the $N_{RX}$ values corresponding to $h(n_1)$, $h(n_2), \ldots, h(n_{N_{RX}})$ to form the channel matrix $H(i)=[h(n_1), h(n_2), \ldots, h(n_{N_{RX}})]^H$, where $i=1, \ldots, \Phi$, n of $C(i,n)=1, \ldots, N_{vec}$, and n of $h(n)=1, \ldots, N_{RX}$.

14. The method of claim 13 wherein the step of generating the precoders includes the steps of:
   a) initializing for all UEs the UE's post coder by setting $G(i)_{(m-0)}=J(i)$, $i=1, \ldots, N_{UE}$ where $J(i)$ is $RI(i) \times N_{RX}$, $N_{UE}$ is the number of UEs, $RI(i)$ is a rank indicator, and m is the m-th iteration;
   b) calculating the precoder $V(i)_{(m+1)}$ for all UEs using $G(i)_{(m)}$;
   c) calculating post coder $G(i)_{(m+1)}$ for all UEs using $V(i)_{(m+1)}$;
   d) calculating $$E = \sum_{i=1}^{N_{UE}} \|G(i)_{(m+1)} - G(i)_{(m)}\|_F^2$$

and comparing E to a convergence threshold $\epsilon$;
   e) setting $m=m+1$ if $E \geq \epsilon$ and repeat steps b) to d) until $$\sum_{i=1}^{N_{UE}} \|G(i)_{(m+1)} - G(i)_{(m)}\|_F^2 < \varepsilon;$$

and
   f) outputting the precoder $V(i)_{(m+1)}$.

15. The method of claim 14 wherein $V(i)_{(m+1)}$ is calculated in accordance with $$V(i) = \left[ \sum_{j=1}^{N_{UE}} H^H(j)G^H(j)G(j)H(j) + \upsilon I \right]^{-1} H^H(i)G^H(i)$$

where $\upsilon$ is the Lagrange multiplier and $G(i)_{(m+1)}$ is calculated in accordance with $$G(i) = V^H(i)H^H(i) \left[ \sum_{j=1}^{N_{UE}} H(i)V(j)V^H(j)H^H(i) + N_o(i)I \right]^{-1}$$

where $N_0$ is the noise variance, $i=1, \ldots, N_{UE}$ and I is an identity matrix.

16. The method of claim 15 wherein the calculating the Lagrange multiplier $\upsilon$ includes the steps of:
   a) calculating singular values $\lambda_i$ of a decomposition $$U \Lambda U^H = \sum_{i=1}^{N_{UE}} H^H(i)_{m+1} G^H(i)_{m+1} G(i)_{(m+1)} H(i)_{(m+1)},$$

where U is a unitary matrix and $\Lambda$ is a singular value;
   b) setting minimum ($\upsilon_{min}$) and maximum ($\upsilon_{max}$) values of the Lagrange multiplier $\upsilon$ based on the calculated singular values $\lambda_i$;
   c) setting the Lagrange multiplier as $\upsilon=(\upsilon_{max}+\upsilon_{min})/2$;
   d) calculating $$\hat{P} = \sum_{i=1}^{N_{TX}} \frac{\lambda_i}{(\lambda_i + \upsilon)^2},$$

where $N_{TX}$ is the total number of transmitting antenna,
   e) calculating $|\hat{P}-P|$ where P is a total transmit power;
   f) comparing $|\hat{P}-P|$ with the convergence threshold $\epsilon$;
   g) setting $\upsilon_{max}=\upsilon$ if $|\hat{P}-P|$ is greater than $\epsilon$ and if $\hat{P}$ is less than P;
   h) setting $\upsilon_{min}=\upsilon$ if $|\hat{P}-P|$ is greater than $\epsilon$ and if $\hat{P}$ is greater than P;
   i) repeating steps c) to h) until $|\hat{P}-P|<\epsilon$ and outputting the Lagrange multiplier $\upsilon$.

17. The method of claim 15 wherein calculating the noise variance $N_0(i)$ includes the steps of:
   calculating the Signal to Interference plus Noise Ratio SINR (i,l) for all UEs based on the SINR threshold contained in the Channel Quality Indicator (CQI) table;
   calculating the noise variance $N_0(i)$ for all UEs in accordance with the following:

$$N_o(i) = \frac{P/N_{UE}}{\sum_{l=1}^{RI} SINR(i, l) / RI(i)},$$

$i = 1, \ldots, N_{UE}$.

18. The method of claim 14 wherein $G(i)_{(m+1)}$ is calculated in accordance with $G(i)=V^H(i)H^H(i)[H(i)V(i)V^H(i)H^H(i)+N_o(i)I]^{-1}$.

19. The method of claim 15 wherein the noise variance is fixed to zero $N_o(i)=0$, $i=1, \ldots, N_{UE}$.

* * * * *